United States Patent [19]

Molina

[11] 4,227,561
[45] Oct. 14, 1980

[54] SEALED FASTENER

[75] Inventor: Jorge W. Molina, Torrance, Calif.

[73] Assignee: Deutsch Fastener Corp., Los Angeles, Calif.

[21] Appl. No.: 903,163

[22] Filed: May 5, 1978

[51] Int. Cl.² .................... F16B 39/00; F16B 37/14
[52] U.S. Cl. ................................ 151/41.74; 85/1 JP; 85/32 K; 85/35
[58] Field of Search ............... 85/1 JP, 32 K, 35, 53, 85/54, 55, 56; 151/41.7, 41.72, 41.74, 69, 70; 403/23, 288; 277/166

[56]  References Cited

U.S. PATENT DOCUMENTS

| | | | |
|---|---|---|---|
| 1,711,291 | 4/1929 | Strama | 151/41.72 X |
| 2,795,144 | 6/1957 | Morse | 85/1 JP X |
| 2,889,156 | 6/1959 | Dearing et al. | 220/304 X |
| 2,892,650 | 6/1959 | Runton | 85/1 JP X |
| 2,986,188 | 5/1961 | Karp et al. | 151/41.73 |
| 3,125,190 | 3/1964 | Brennan | 85/53 X |
| 3,168,321 | 2/1965 | Glicksman | 85/1 JP X |
| 3,176,747 | 4/1965 | Nenzell | 151/41.7 |
| 3,370,633 | 2/1968 | Camenisch et al. | 151/41.74 |
| 3,646,982 | 3/1972 | Cushman | 151/41.7 |
| 3,695,324 | 10/1972 | Gulistan | 151/41.74 |

FOREIGN PATENT DOCUMENTS

| | | | |
|---|---|---|---|
| 594260 | 3/1960 | Canada | 151/21 B |
| 1263923 | 5/1961 | France | 85/1 JP |

*Primary Examiner*—Thomas J. Holko
*Attorney, Agent, or Firm*—Gausewitz, Carr, Rothenberg & Edwards

[57]  ABSTRACT

This invention provides a sealed fastener that includes a housing and a nut assembly, the housing having a base and a receptacle extending beyond the base on one side, an annular seal being positioned on the opposite side of the base and engaged by a flange of the receptacle which holds the receptacle to the base. The nut assembly includes a threaded member within the receptacle and a sleeve extending through an opening into the base and beyond the opposite side of the base. The sleeve is bendable outwardly to form a flange to cooperate with the base in holding the fastener to a workpiece, the seal including a bead which will engage such a workpiece and prevent leakage when the flange on the sleeve is so formed.

10 Claims, 6 Drawing Figures

U.S. Patent  Oct. 14, 1980  Sheet 1 of 2  4,227,561
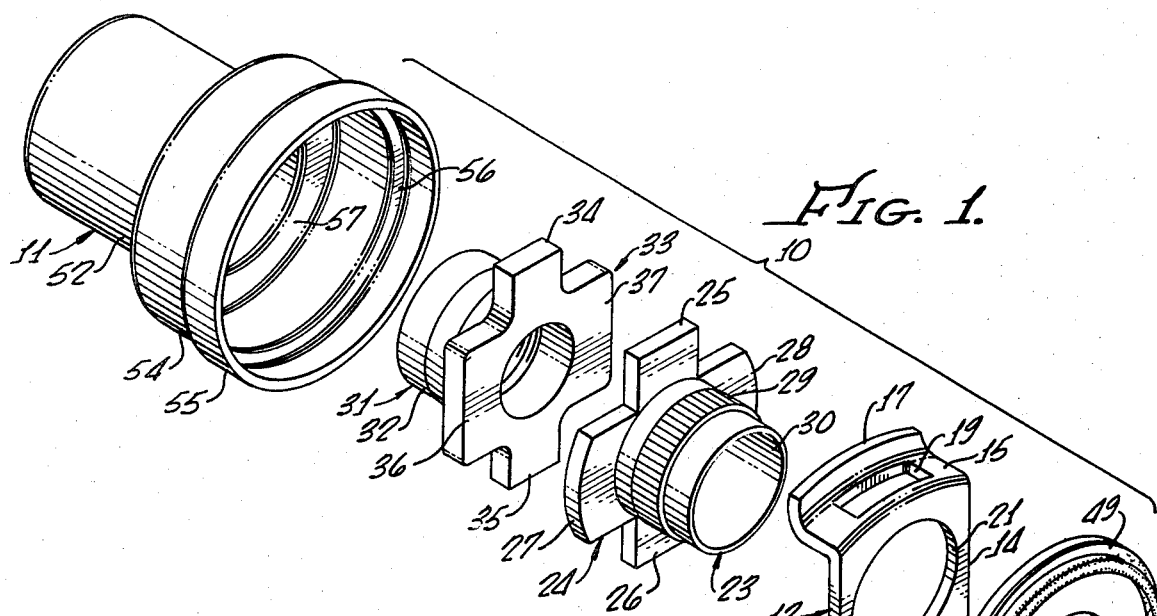
FIG. 1.
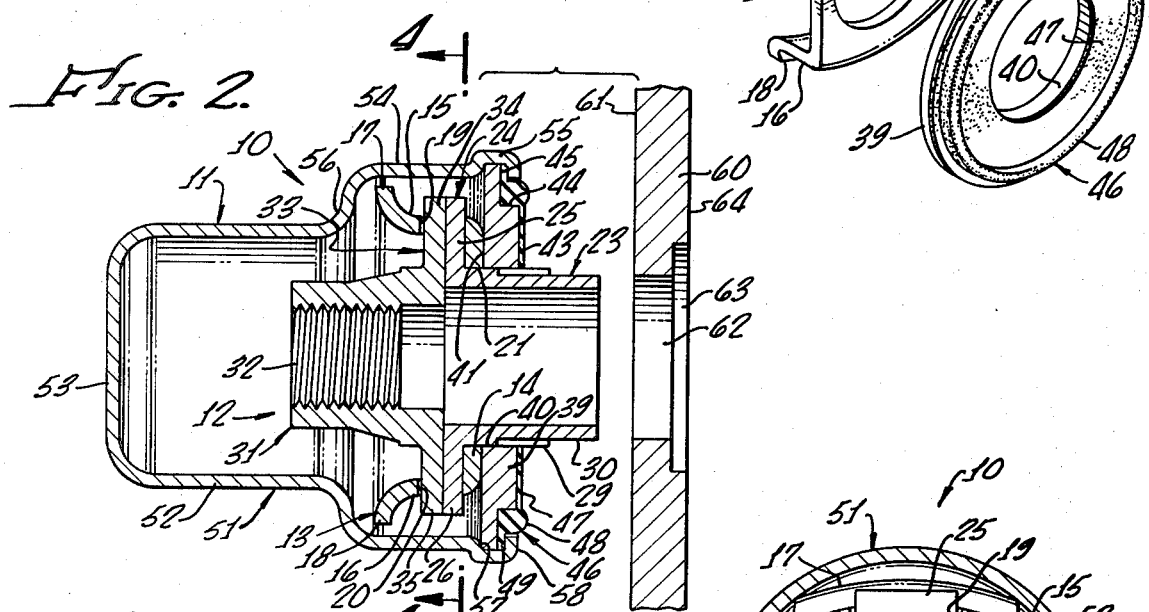
FIG. 2.
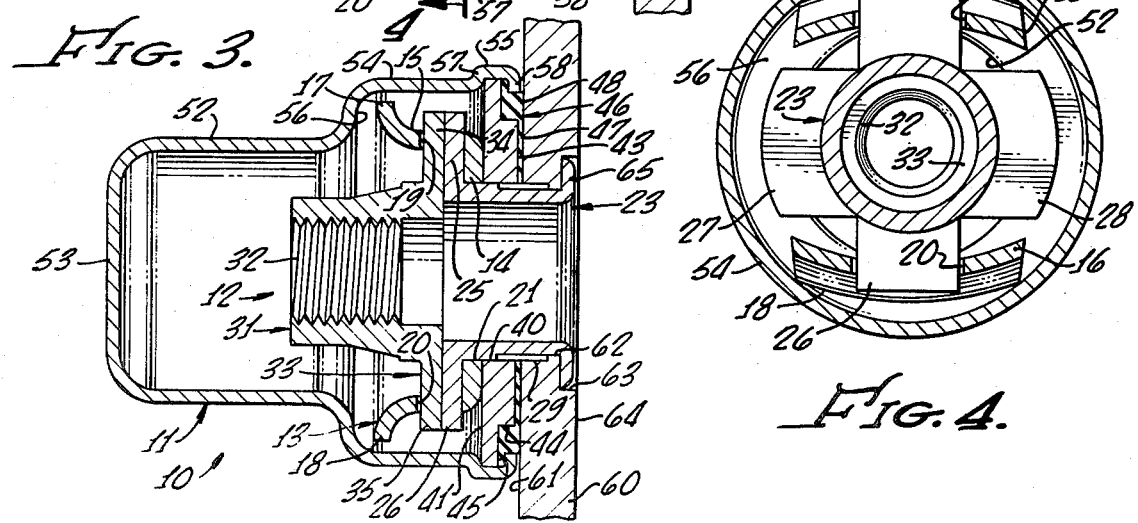
FIG. 3.
FIG. 4.

SEALED FASTENER

BACKGROUND OF THE INVENTION

1. Field of the Invention

This invention relates to a sealed fastener.

2. Description of the Prior Art

Fasteners used in conjunction with fuel tanks for aircraft or the like present a problem in preventing leakage through the openings for the fasteners. Fasteners used in such installations may include a nut that is part of an assembly held to the structure by two rivets. The potential for leakage exists at the openings for the rivets as well as through the opening where the bolt is received for engaging the nut. Sealing of the nut assembly is complicated by the fact that the spaced rivets may provide a clamping force only at two isolated areas. If a gasket is used, the unequal clamping of the assembly may allow leakage to occur. Consequently, it has been the practice to apply sealing putty to the entire nut assembly, including the riveted area, in order to prevent leakage. This is time-consuming and, therefore, expensive, and raises the prospect of a fuel leak from inadequately applied sealant. Moreover, a considerable weight penalty results from the addition of the sealant material.

SUMMARY OF THE INVENTION

The present invention provides a nut, attachable to a workpiece such as a panel used in a fuel tank, which prevents fuel leakage without requiring separately applied sealant material. The result is a greater assurance of a complete seal and a substantial reduction in assembly time and hence in the cost of the structure, as well as a savings in weight.

The fastener includes a housing and a nut assembly. The housing includes a base and a receptacle extending from the base on one side. The nut assembly includes a threaded portion within the housing and a sleeve extending through an opening in the base beyond the opposite side of the base. The sleeve includes a straight knurl on its periphery which is forced into the wall of the opening that receives the sleeve when the fastener is to be applied to a structure such as a panel. This precludes rotation of the assembly relative to the panel. A resilient sealing element is provided on the base and bears against the panel. The seal is compressed uniformly around its perimeter to prevent fluid leakage as the sleeve is flared outwardly forming a flange. This flange cooperates with the base to hold the assembly to the panel, as well as to compress the seal. Irrespective of the presence of the sealing element, electrical continuity is maintained by the engagement of the sleeve with the structure, and the mating part's engaging the threads of the nut.

BRIEF DESCRIPTION OF THE DRAWINGS

FIG. 1 is an exploded perspective view of the sealed nut of this invention;

FIG. 2 is a longitudinal sectional view of the device prior to association with a panel;

FIG. 3 is a view similar to FIG. 2, showing the device after attachment to the panel;

FIG. 4 iw e tranwierwa wactiknal view taken along the line 4—4 of FIG. 2;

DESCRIPTION OF THE PREFERRED EMBODIMENT

Figure 5:
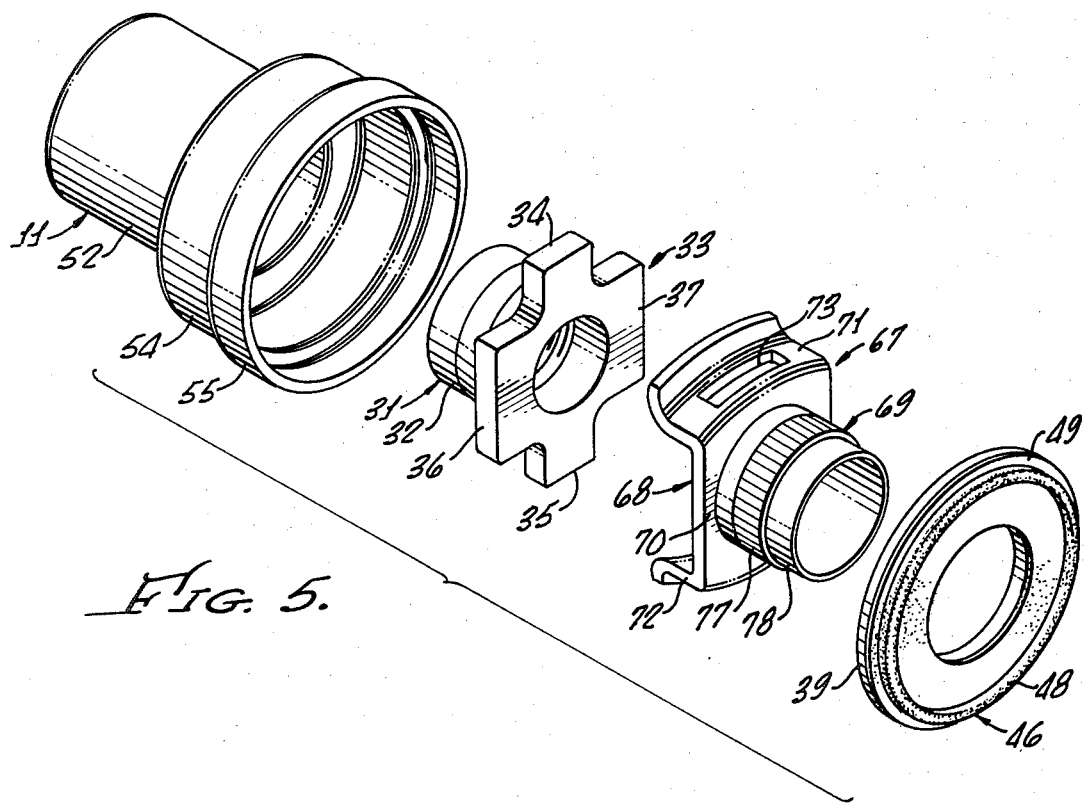
FIG. 5 is an exploded perspective view of a modified form of the sealed nut.

The fastener 10 of this invention includes a sealed housing 11 within which is a nut assembly 12 of the type shown in U.S. Pat. No. 3,695,324. This nut assembly includes a bracket 13, which is substantially U-shaped in side elevation, including a bottom wall 14 and upstanding sidewalls 15 and 16, with arcuate outwardly inclined outer edges 17 and 18. Rectangular openings 19 and 20 are formed in the sidewalls 15 and 16 below their arcuate upper portions 17 and 18. An enlarged circular opening 21 extends through the bottom wall 14 of the bracket 13.

A sleeve 23 extends through the opening 21, projecting beyond the undersurface of the bottom wall of the bracket 13. At the opposite end of the sleeve 23 is a transverse head 24, one portion of which is formed by oppositely projecting ears 25 and 26 that extend through the lower portions of the openings 19 and 20 in the sidewalls 15 and 16 of the bracket 13. Additional oppositely extending ears 27 and 28 fit between the sidewalls 15 and 16. The head 24 overlies the bottom wall 14 of the bracket 13.

The sleeve 23 is of malleable material and includes a straight knurl 29 intermediate its ends. The outer end portion 30 has a smooth cylindrical exterior which is of reduced diameter, giving the end of the sleeve a relatively thin bendable wall.

Above the sleeve 23 of the fastener is a nut 31 having a central threaded portion 32 and base 33, which defines oppositely projecting ears 34 and 35 that extend through the openings 19 and 20 in the sidewalls 15 and 16 of the bracket 13. The ears 34 and 35 are positioned above the ears 25 and 26 of the retention sleeve. Additional oppositely projecting ears 36 and 37 fit between the sidewalls 15 and 16.

The sealed housing 11 includes a base plate 39 having a central opening 40 through which the sleeve 23 projects. This causes the knurl 29 to extend outwardly beyond the plate 39. The flat inner surface 41 of the plate 39, around the opening 40, is engaged by the bottom wall 14 of the bracket 13. On its opposite side, the base 39 includes a flat wall portion 43 adjacent the opening 40, connecting through an axially extending shoulder 44 to a recessed peripheral wall portion 45 that is parallel to the surface 43.

A gasket 46 extends over the surface 43, the shoulder 44, and the peripheral surface 45 of the base 39. The gasket 46 illustrated is made of a resilient elastomer and may be molded in place on the base 39. Adjacent the surface 43, the gasket section 47 is relatively thin. A thicker portion 48, outwardly of the sleeve 23, circumscribes the shoulder 44 at the peripheral surface 45, defining an annular bead which is rounded convexly in cross section and projects beyond the plane of the inner gasket section 47. The outer marginal portion 49 of the gasket, on the peripheral surface 45 of the base, is relatively thin and, therefore, is recessed beneath the thick portion 48 of the gasket.

The other portion of the housing 11 is a cup-shaped receptacle 51, having a relatively narrow outer part 52 and a closed end 53. The receptacle is flared outwardly to an intermediate portion 54 of greater diameter and an end portion 55 of still larger diameter. This results in a shoulder 56 between the receptacle sections 52 and 54, and another shoulder 57 between the sections 54 and 55.

The receptacle 51 fits over the nut assembly 12 and base 39 with the shoulder 57 engaging the marginal portion of the inner surface 41 of the base 39. This also brings the shoulder 56 into adjacency with the edge portions 17 and 18 of the sidewalls 15 and 16 of the bracket 13. The end of the portion 54 of the receptacle 51 is bent inwardly so that it forms a flange 58 that cooperates with the shoulder 57 to hold the receptacle and base together. The flange 58 closely overlies and compresses the marginal portion 49 of the gasket 46. This provides a seal so that liquids cannot flow between the base 39 and the receptacle 51 at the outer periphery of the base.

The fastener then is ready for use in which it is connected to a workpiece such as a panel 60, which may be the wall of a fuel tank. The fastener is mounted on the inner surface 61 of the panel 60 where it will be in a liquid environment. An opening 62 is formed in the panel 60, extending from its inner surface 61 to a counterbore 63 that continues to the outer panel surface 64. The opening 62 is dimensioned to provide a clearance for the outer end portion 30 of the sleeve 23, which is of reduced diameter, but to provide an interference to the knurl 29. Consequently, the knurl 29 becomes embedded in the panel 60 along the periphery of the opening 62, as the sleeve 23 is forced into the opening 62 from the position of FIG. 2 to that of FIG. 3. This precludes rotation of the fastener 10 relative to the panel 60. The shoulder 56 of the receptacle, being adjacent the edges 17 and 18 of the walls 15 and 16 of the nut assembly, holds the nut assembly to the base 39. Therefore, the nut assembly does not move axially into the receptacle 11 and it is possible to press the sleeve 23 into the opening 62 by pressing on the receptacle.

After the sleeve is extended through the opening 62, the outer end 30 of the sleeve 23 is flared outwardly to form a flange 65 overlying the panel 60 at the counterbore 63. The flange 65, reacting through the head 24 of the sleeve 23, cooperates with the bottom wall 14 of the bracket 13 and the base 39 of the housing 11 to retain the fastener 10 to the panel 60. The flange 65 is pressed axially inwardly as it is flared outwardly so as to cause the thick beaded portion 48 of the gasket to become compressed against the surface 61 of the panel. The compression of the gasket is uniform at all rotational positions.

The result is a seal around the periphery of the fastener 10, resulting from the engagement of the gasket section 48 with the surface 61. Liquid, therefore, cannot flow inwardly past the gasket portion 48 so that it cannot enter the opening 62. The gasket is compressed radially inwardly into the recesses of the knurl 29, as well, sealing at this location also. Neither can liquid flow into the interior of the housing 11 around the inner side of the flange 58 of the receptacle, where the gasket is clamped. Therefore, the fastener provides a complete seal to preclude all fluid leakage. The flange 65 is preferably formed by the use of the tool illustrated in U.S. Pat. No. 3,665,581 which easily permits the end of the sleeve 23 to be bent outwardly and the necessary compression to be generated to assure that the gasket section 48 provides a seal.

With the fastener 10 installed on the panel 60, it provides an outwardly facing nut with an opening through the sleeve 23 to enable a bolt to enter and engage the threaded section 32. The elongated upper portion 52 of the receptacle provides clearance for the bolt beyond the end of the nut, assuring that the bolt will not damage the fastener or disturb the seal. The nut 31 will not rotate appreciably as the bolt is threaded into it because of the embodiment of the knurl 29 in the wall of the opening 62. The edges of the openings 19 and 20 in the sidewalls 15 and 16 of the bracket 13, and the ears 25 and 26 of the sleeve head form abutments that interengage to hold the bracket against substantial rotation. Similarly, the ears 34 and 35 of the nut 31 act as abutments engaging the edges of the openings 19 and 20 so that the nut is prevented from turning, as well.

For high temperature uses, the metal components of the nut may be of stainless steel and the gasket of polytetrafluoroethylene, as sold under the trademark "Teflon."

Figure 6:
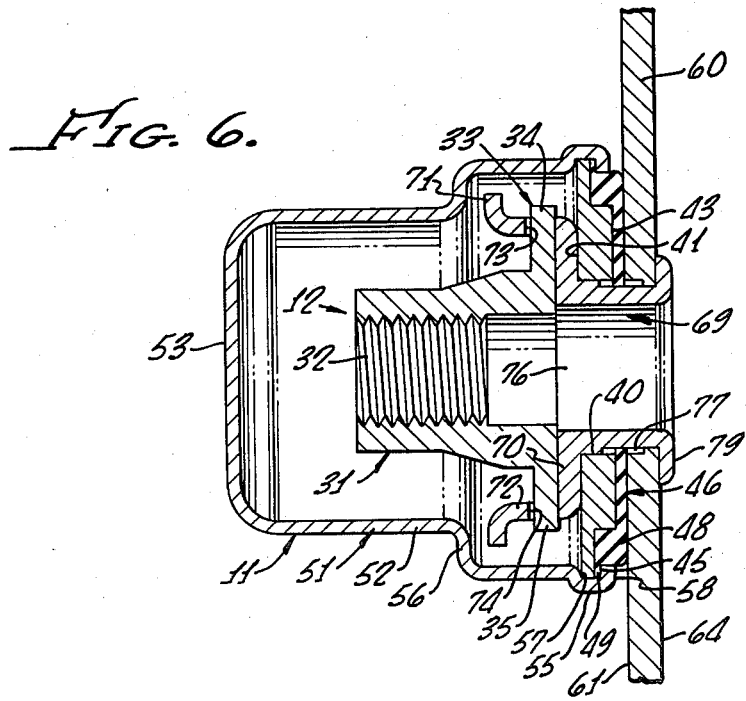
FIG. 6 is a longitudinal sectional view of the nut of FIG. 5 as secured to a panel.

The version of the fastener shown in FIGS. 5 and 6 differs from the previously described embodiment in that the bracket and sleeve are made as one piece. This is in the form of a member 67, which has a bracket section 68 at one end and a sleeve 69 at the opposite end. The bracket portion includes a bottom wall 70 and upstanding sidewalls 71 and 72. Openings 73 and 74, in the sidewalls of the brackets, are dimensioned to receive the ears 34 and 35 of the nut 31. The openings 73 and 74 are similar to the openings 19 and 20 in the bracket 13, but have less height because they need to receive only the ears 34 and 35 of the nut 31.

An opening 76 is in the center of the bottom wall 70, with the inner surface of the sleeve 69 forming a continuation of this opening. The sleeve 69 is similar to the sleeve 23, including a straight knurl 77 intermediate its ends and an outer end portion 78 of reduced outside diameter.

In the assembled fastener, the base of the nut 31 overlies the bottom wall 70 of the bracket portion, with its opposite ears 34 and 35 received within the openings 73 and 74 of the bracket sidewalls. The other side of the bottom wall 70 is next to the inside surface of the base member 39 with the sleeve 69 extending through the opening 40 of the base.

The attachment of the fastener to a panel or other structure is the same as in the previously described embodiment. The shoulder 56 of the receptacle cooperates with the outer edges of the walls 72 and 73 to hold the member 67 axially within the receptacle 51, allowing the sleeve 69 to be pressed into the opening in the panel by pushing on the receptacle. The thinner end portion 78 of the sleeve 69 then is flared outwardly to form a flange 79 to secure the assembly to the structure and to compress the gasket 46. The knurl 77 becomes embedded in the wall of the opening in the supporting panel and precludes rotation of the member 67 relative to the panel. This, in turn, through the bracket portion 68, prevents the nut 31 from turning.

The foregoing detailed description is to be clearly understood as given by way of illustration and example only, the spirit and scope of this invention being limited solely by the appended claims.

I claim:

1. A sealed nut device comprising
   a housing having
      a base
      and a closed receptacle extending from said base in one direction,
      said base having an opening therethrough, a sealing member extending around said opening and facing outwardly of said base in the opposite direction, said receptacle including a shoulder overlying the marginal portion of said base on said one side thereof and a flange overlying the marginal portion of said base on the opposite side thereof, said sealing member including a first annular portion intermediate said flange and said opposite side of said base, whereby said base is connected to said receptacle and is sealed relative thereto, a second annular portion adjacent and radially inwardly of said first annular portion, said second annular portion projecting outwardly of said opposite side beyond said flange for engagement with a workpiece, and a third annular portion adjacent said second annular portion and extending radially inwardly therefrom to an inner edge adjacent said opening, said third annular portion being recessed beneath said second annular portion, said second annular portion being thicker than either of said first annular portion and said third annular portion, and nut means, said nut means including a threaded portion in said housing, and a sleeve extending through said opening and projecting beyond said base in said opposite direction, said sleeve being adapted to be extended through an opening in a workpiece and being bendable to form a flange for cooperating with said base to retain said housing and nut means to such a workpiece and to cause said sealing member to engage said workpiece for precluding fluid flow.

2. A device as recited in claim 1 in which said threaded portion includes a member having a threaded opening therein, said sleeve including a portion engaging said member in said housing for preventing substantial rotational movement of said member relative to said sleeve.

3. A device as recited in claim 1 in which said sleeve is provided with a straight knurl inwardly of the outer end thereof for becoming embedded in the wall of an opening in a workpiece receiving said sleeve, and in which said receptacle includes means for preventing substantial movement of said sleeve inwardly with respect to said receptacle, whereby said receptacle can be used to press said sleeve into such an opening in such a panel.

4. A device as recited in claim 3 in which said nut means includes a member integral with said sleeve having walls projecting in said one direction from said base into said receptacle, said walls having openings therethrough, said threaded portion including an element having an opening with threads formed therein, and laterally projecting outer portions extending into said openings in said walls, whereby said walls preclude substantial rotational movement of said element relative to said member, and in which said means for preventing substantial movement of said sleeve inwardly of said receptacle includes an inwardly directed shoulder defined by said receptacle, extending over said walls of said nut means for preventing substantial movement of said walls and thereby holding said sleeve.

5. A device as recited in claim 3 in which said third annular portion extends to said opening and is adapted to enter the recesses of said knurl when said housing and said nut means are so attached to said workpiece.

6. A device as recited in claim 3 in which said nut means includes a member having walls projecting in said one direction from said base into said receptacle, said walls having openings therethrough, said sleeve having portions extending into said openings for precluding substantial movement of said sleeve axially and rotationally relative to said member, and in which said means for preventing substantial movement of said sleeve inwardly of said receptacle includes an inwardly directed shoulder defined by said receptacle, extending over said walls of said nut means for preventing substantial movement of said walls and thereby holding said sleeve.

7. A device as recited in claim 6 in which said threaded portion of said nut means includes an element having an opening with threads formed therein, and laterally projecting outer portions extending through said openings in said walls adjacent said laterally projecting portions of said sleeve, whereby said walls preclude substantial axial and rotational movement of said element relative to said member.

8. A device as recited in claim 1 in which said sealing member is made of resilient elastomer and said second annular portion defines a bead projecting outwardly of said base in said opposite direction.

9. A device as recited in claim 1 in which said base is recessed beneath said first and said second annular portions.

10. A device as recited in claim 1 in which said first and said third annular portions are flat, and said second annular portion is convexly rounded so as to provide an annular bead.

* * * * *